(No Model.) 10 Sheets—Sheet 1.

E. N. CHAMBERLAIN.
TYPE WRITING MACHINE.

No. 582,980. Patented May 18, 1897.

WITNESSES:
Paul Jobst
C. R. Ferguson

INVENTOR
E. N. Chamberlain
BY
ATTORNEYS.

(No Model.) 10 Sheets—Sheet 3.

E. N. CHAMBERLAIN.
TYPE WRITING MACHINE.

No. 582,980. Patented May 18, 1897.

WITNESSES:

INVENTOR
E. N. Chamberlain.
BY
ATTORNEYS.

(No Model.) 10 Sheets—Sheet 4.

E. N. CHAMBERLAIN.
TYPE WRITING MACHINE.

No. 582,980. Patented May 18, 1897.

WITNESSES:

INVENTOR
E. N. Chamberlain.
BY
ATTORNEYS.

(No Model.)  10 Sheets—Sheet 5.
E. N. CHAMBERLAIN.
TYPE WRITING MACHINE.
No. 582,980. Patented May 18, 1897.
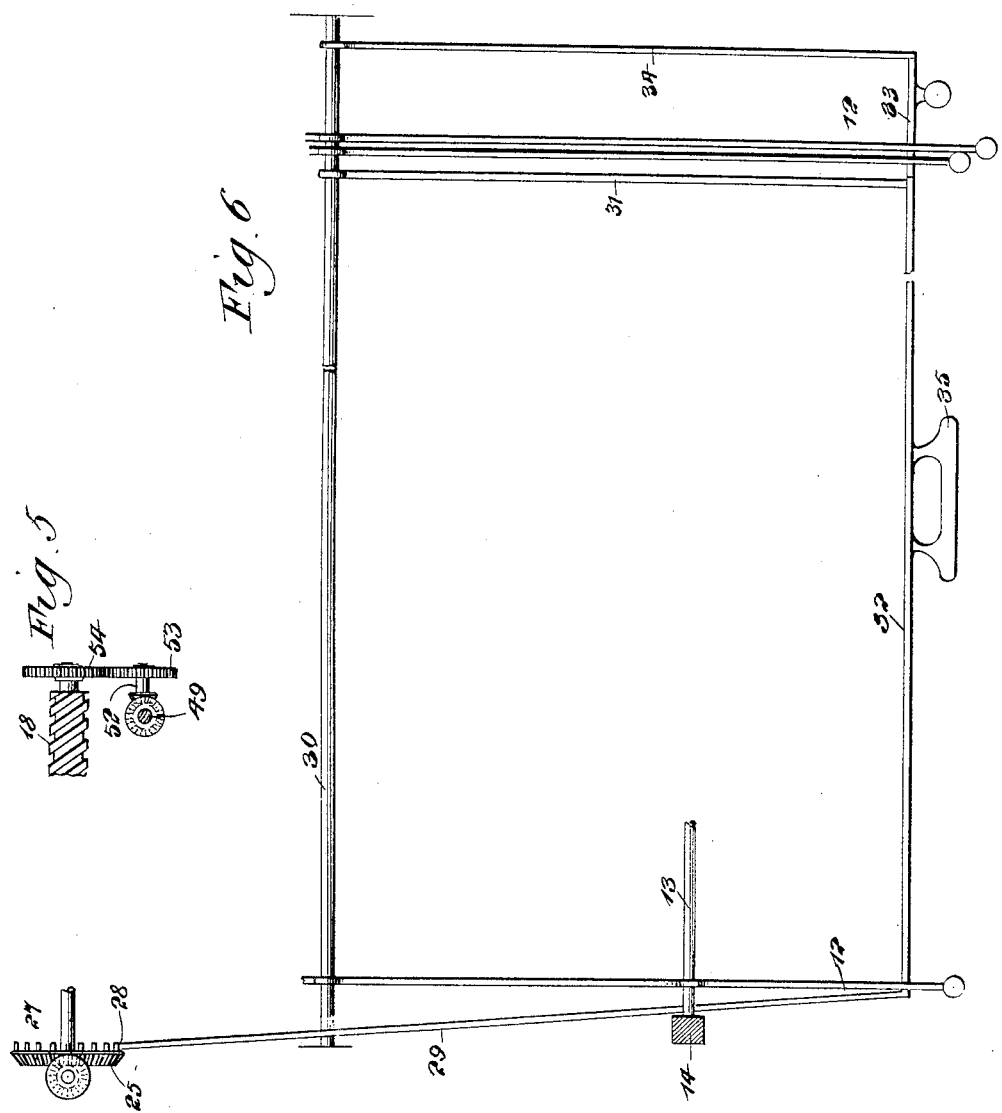
INVENTOR
E. N. Chamberlain
BY
ATTORNEYS.
WITNESSES:

(No Model.) 10 Sheets—Sheet 6.
E. N. CHAMBERLAIN
TYPE WRITING MACHINE.
No. 582,980. Patented May 18, 1897.
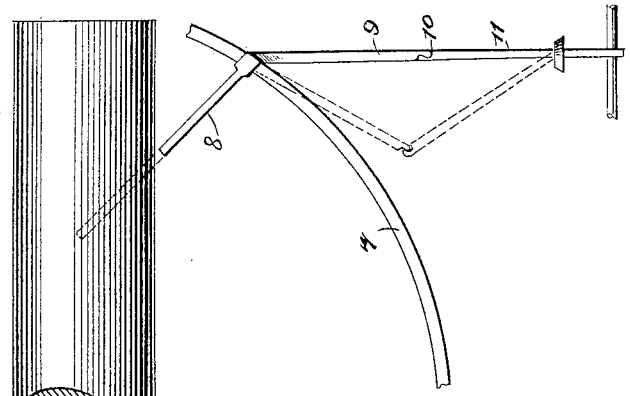
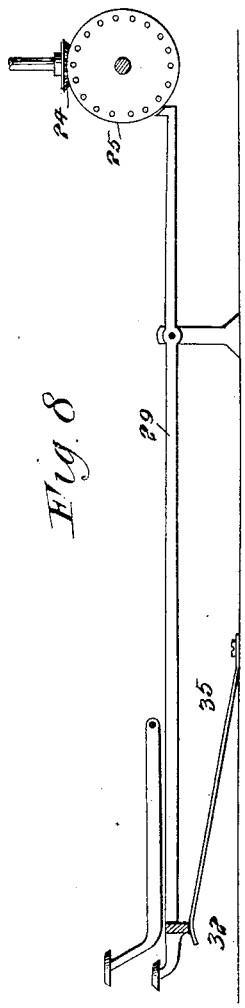
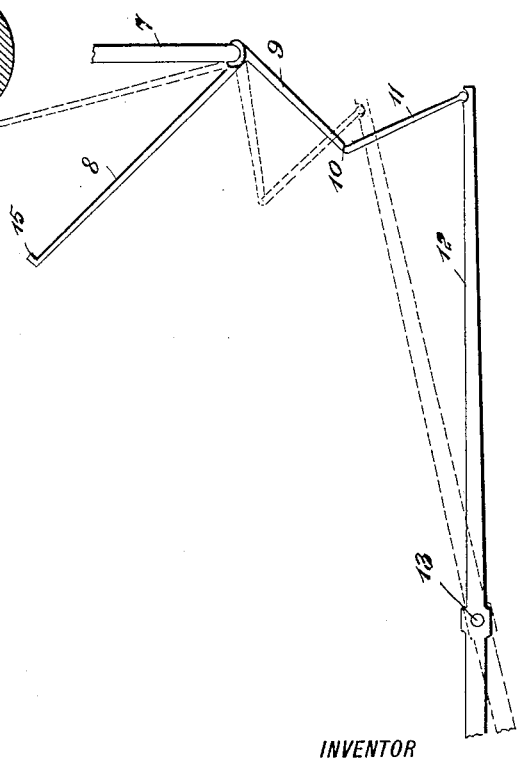
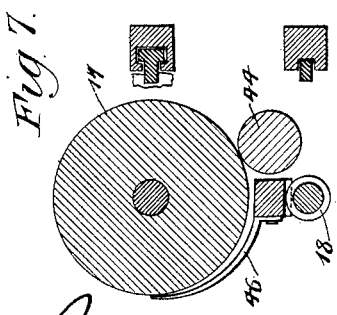
WITNESSES:
INVENTOR
E. N. Chamberlain
BY
ATTORNEYS.

(No Model.) 10 Sheets—Sheet 7.
E. N. CHAMBERLAIN.
TYPE WRITING MACHINE.
No. 582,980. Patented May 18, 1897.
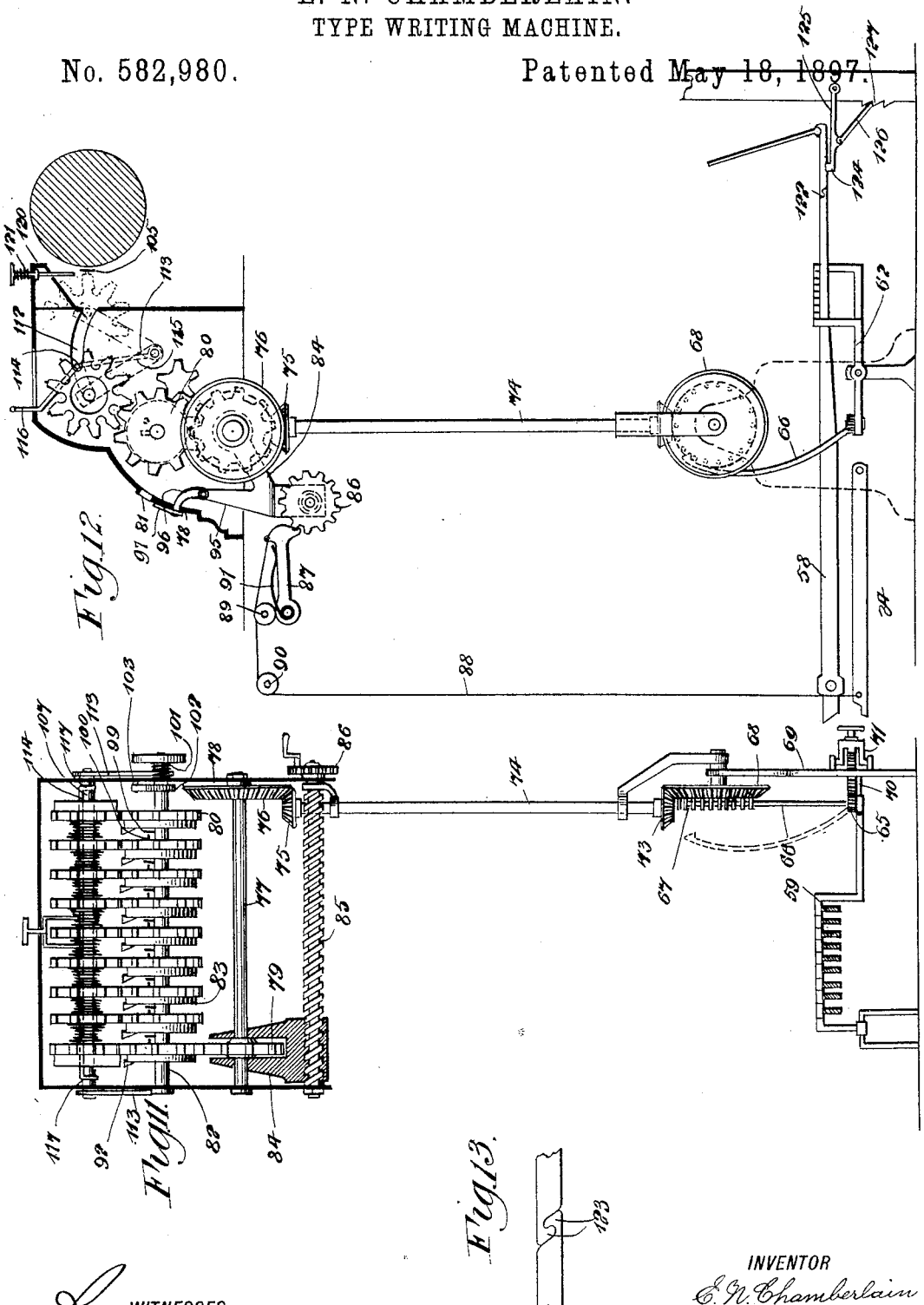
WITNESSES:
Paul Jones
INVENTOR
E. N. Chamberlain
BY
ATTORNEYS.

(No Model.) 10 Sheets—Sheet 8.
E. N. CHAMBERLAIN.
TYPE WRITING MACHINE.
No. 582,980. Patented May 18, 1897.
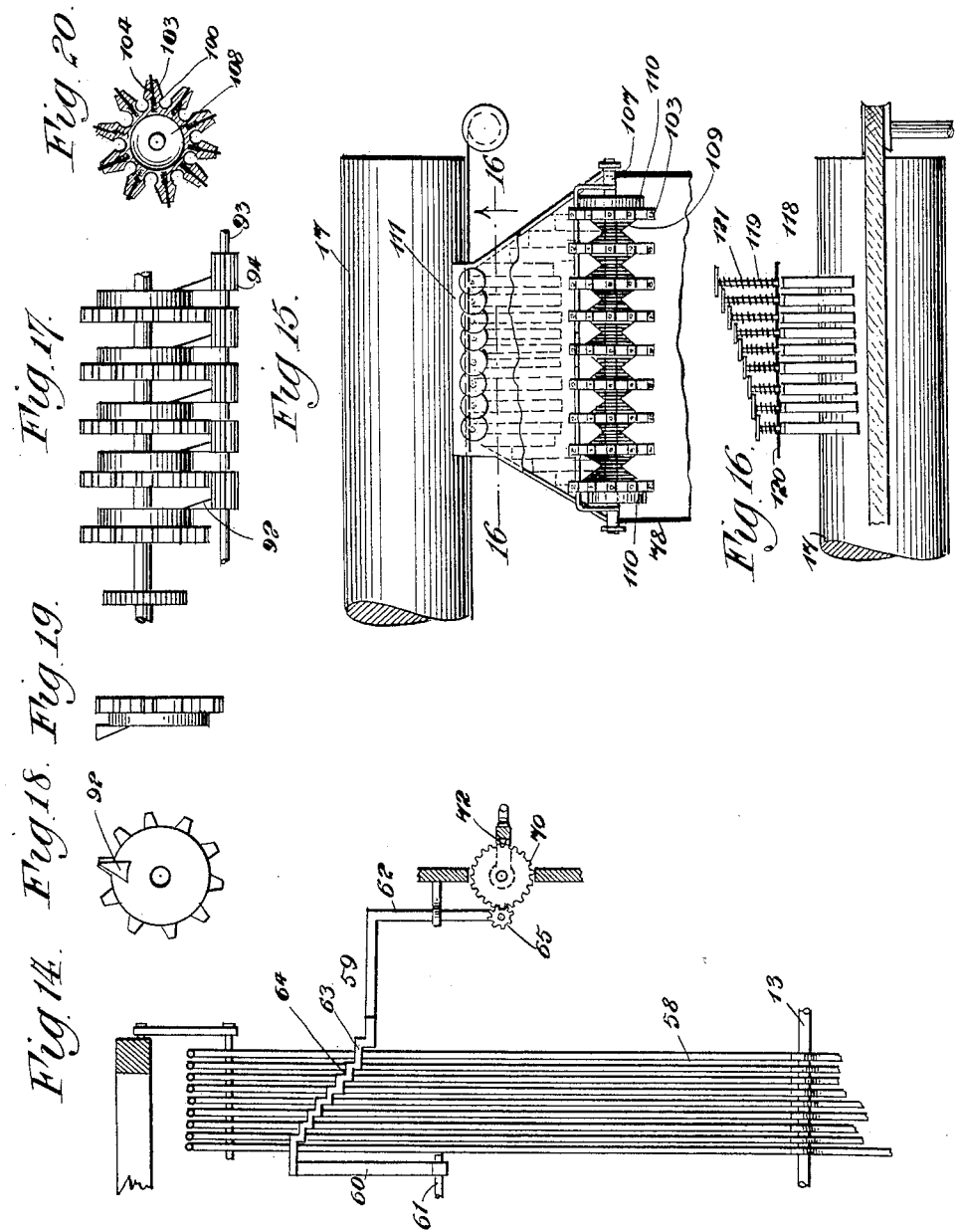
WITNESSES:
INVENTOR
E. N. Chamberlain.
BY
ATTORNEYS.

(No Model.) 10 Sheets—Sheet 9.
E. N. CHAMBERLAIN.
TYPE WRITING MACHINE.
No. 582,980. Patented May 18, 1897.
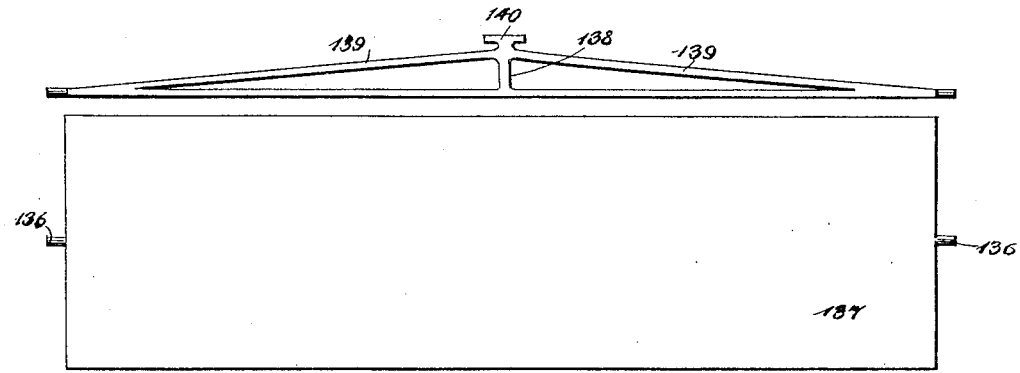
*Fig. 24.*
*Fig. 25.*
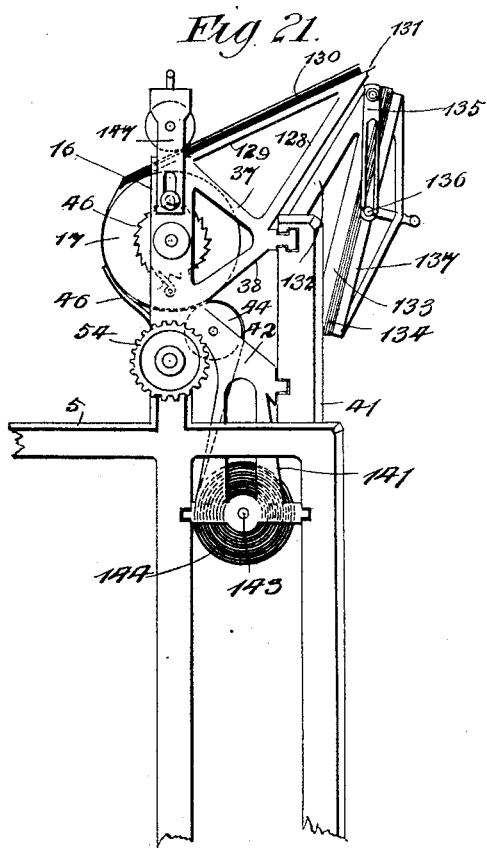
*Fig. 21.*
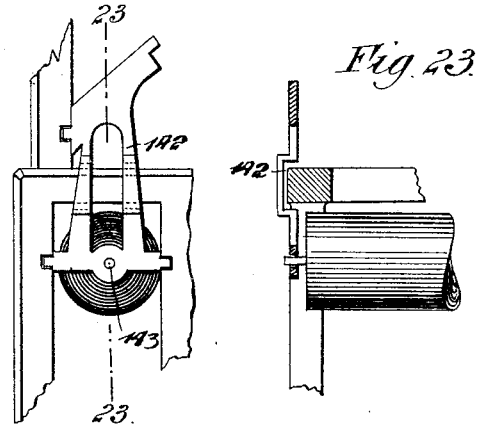
*Fig. 22.*
*Fig. 23.*
WITNESSES:
INVENTOR
E. N. Chamberlain
BY
ATTORNEYS.

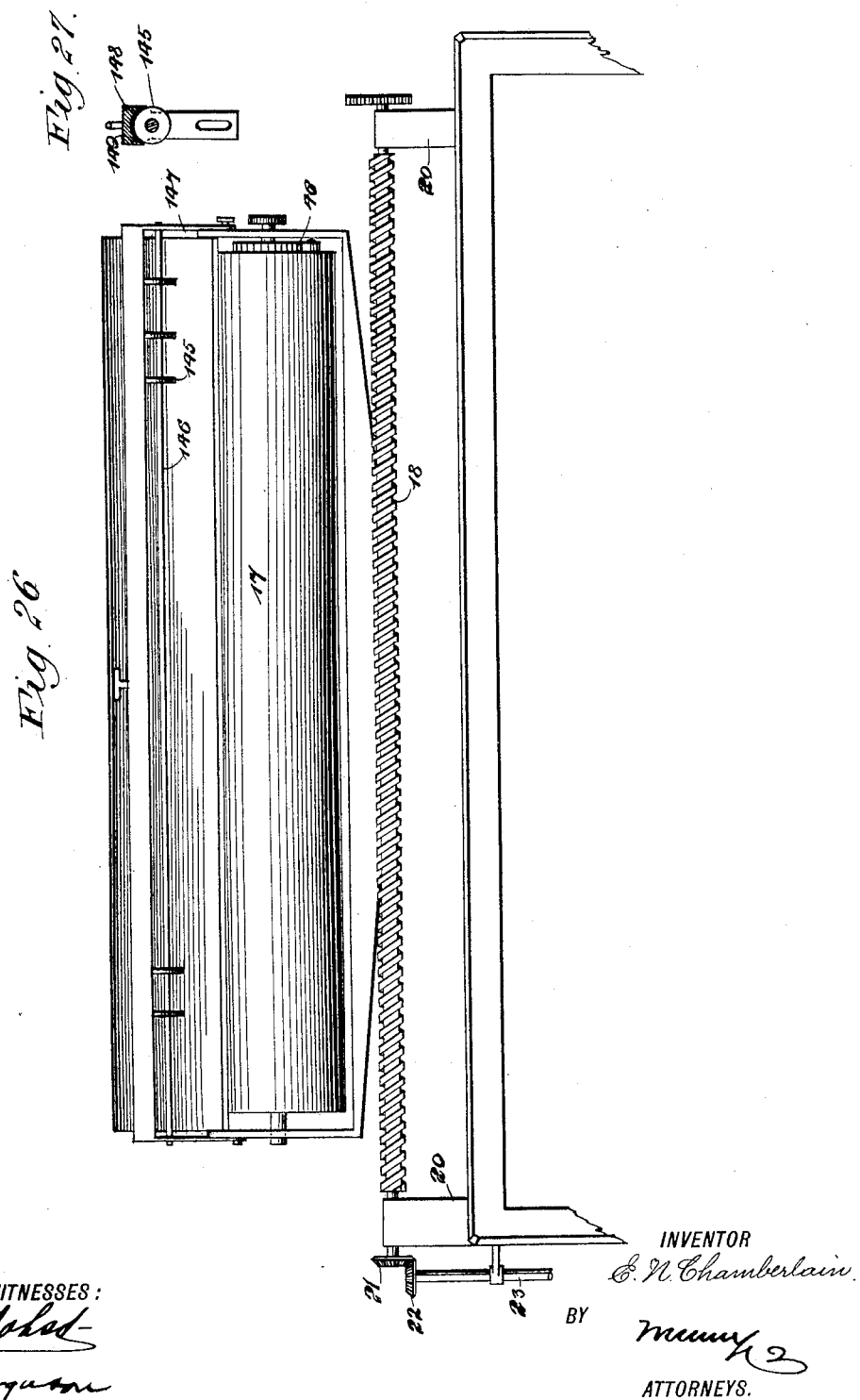

UNITED STATES PATENT OFFICE.

EDWARD NORMAN CHAMBERLAIN, OF NATCHEZ, MISSISSIPPI.

TYPE-WRITING MACHINE.

SPECIFICATION forming part of Letters Patent No. 582,980, dated May 18, 1897.

Application filed October 13, 1896. Serial No. 608,695. (No model.)

*To all whom it may concern:*

Be it known that I, EDWARD NORMAN CHAMBERLAIN, of Natchez, in the county of Adams and State of Mississippi, have invented a new and Improved Type-Writing Machine, of which the following is a full, clear, and exact description.

This invention relates to type-writing machines; and the object is to provide a typewriting machine of comparatively few parts and which may be easily operated, and, further, to provide a type-writing machine with an adding device, whereby amounts may be quickly added by operating the key or keys of the machine and then impressed upon paper, and, further, to provide a mechanism in connection with the machine whereby a billhead or letter-head may be stamped on the paper before writing upon the same.

I will describe the machine embodying my invention and then point out the novel features in the appended claims.

Reference is to be had to the accompanying drawings, forming a part of this specification, in which similar characters of reference indicate corresponding parts in all the views.

Figure 1:
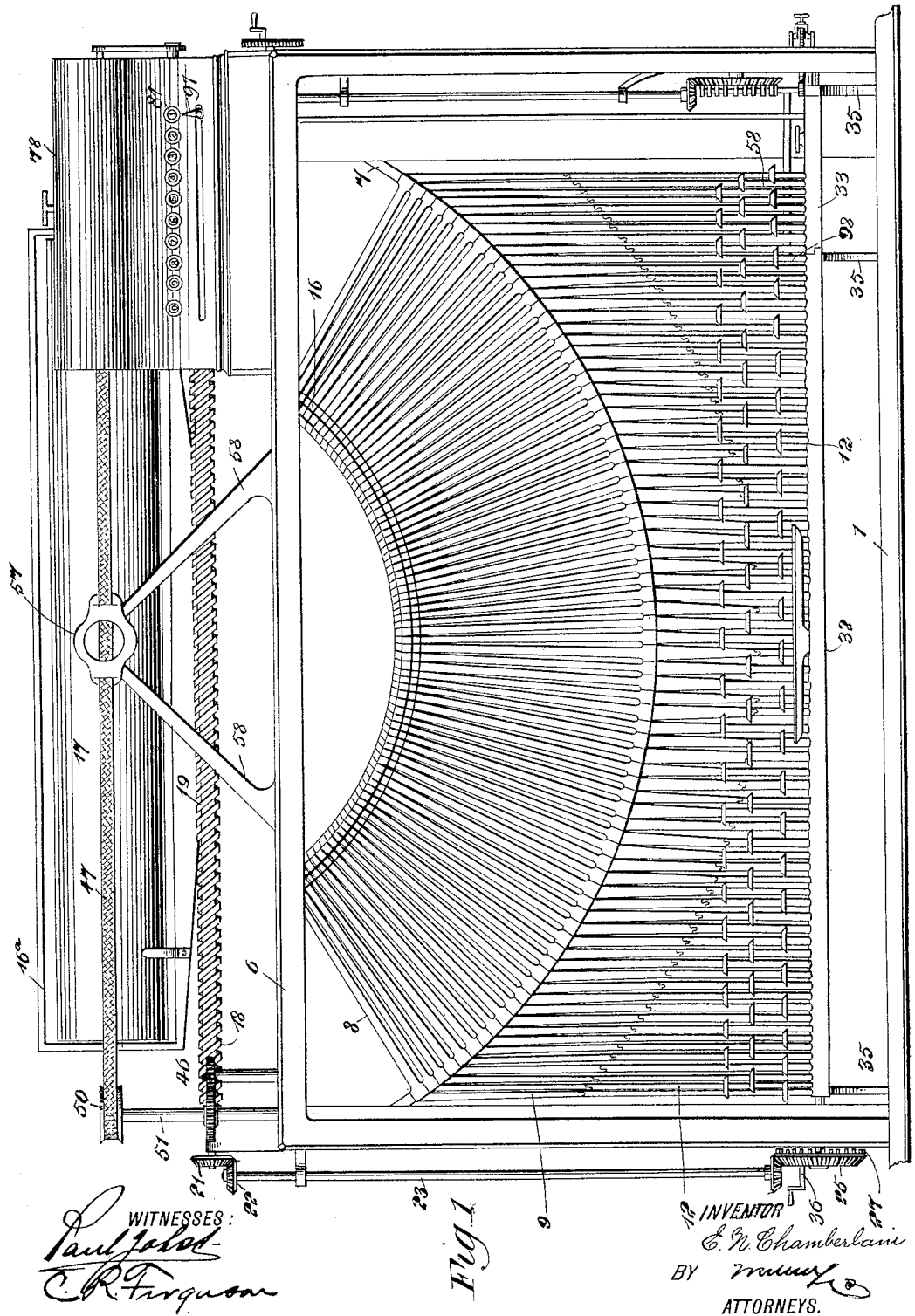
Figure 2:
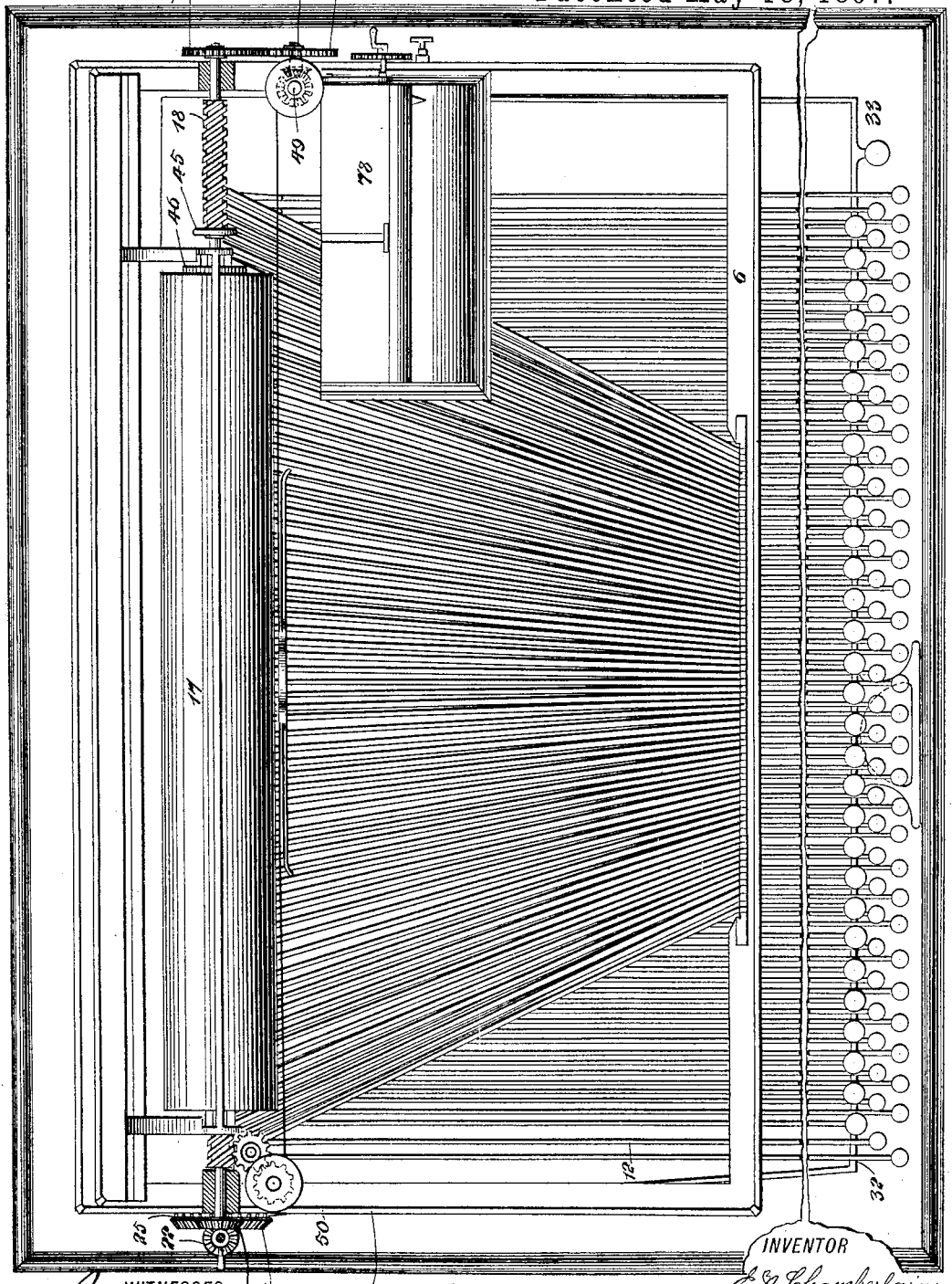
Figure 3:
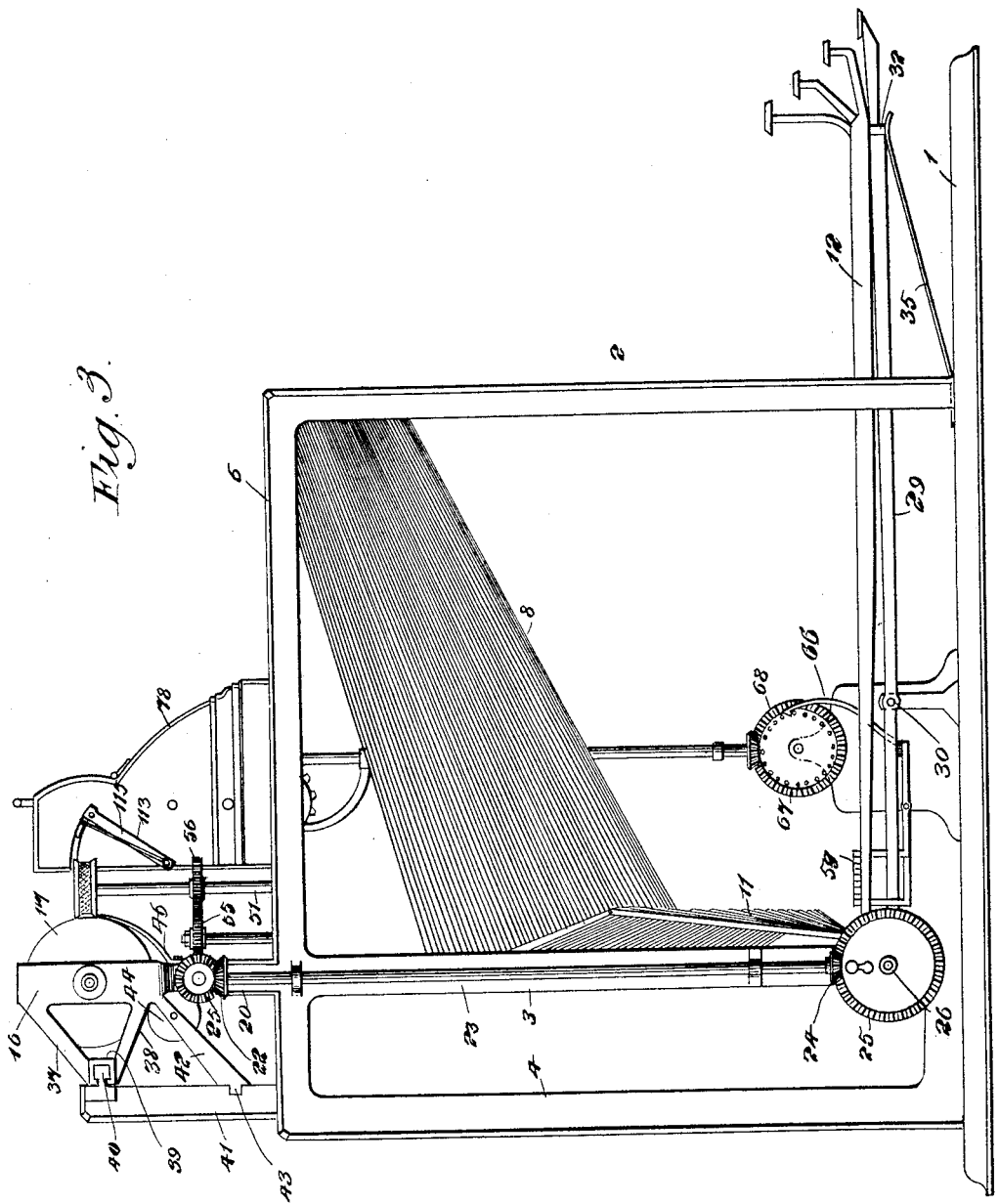
Figure 4:
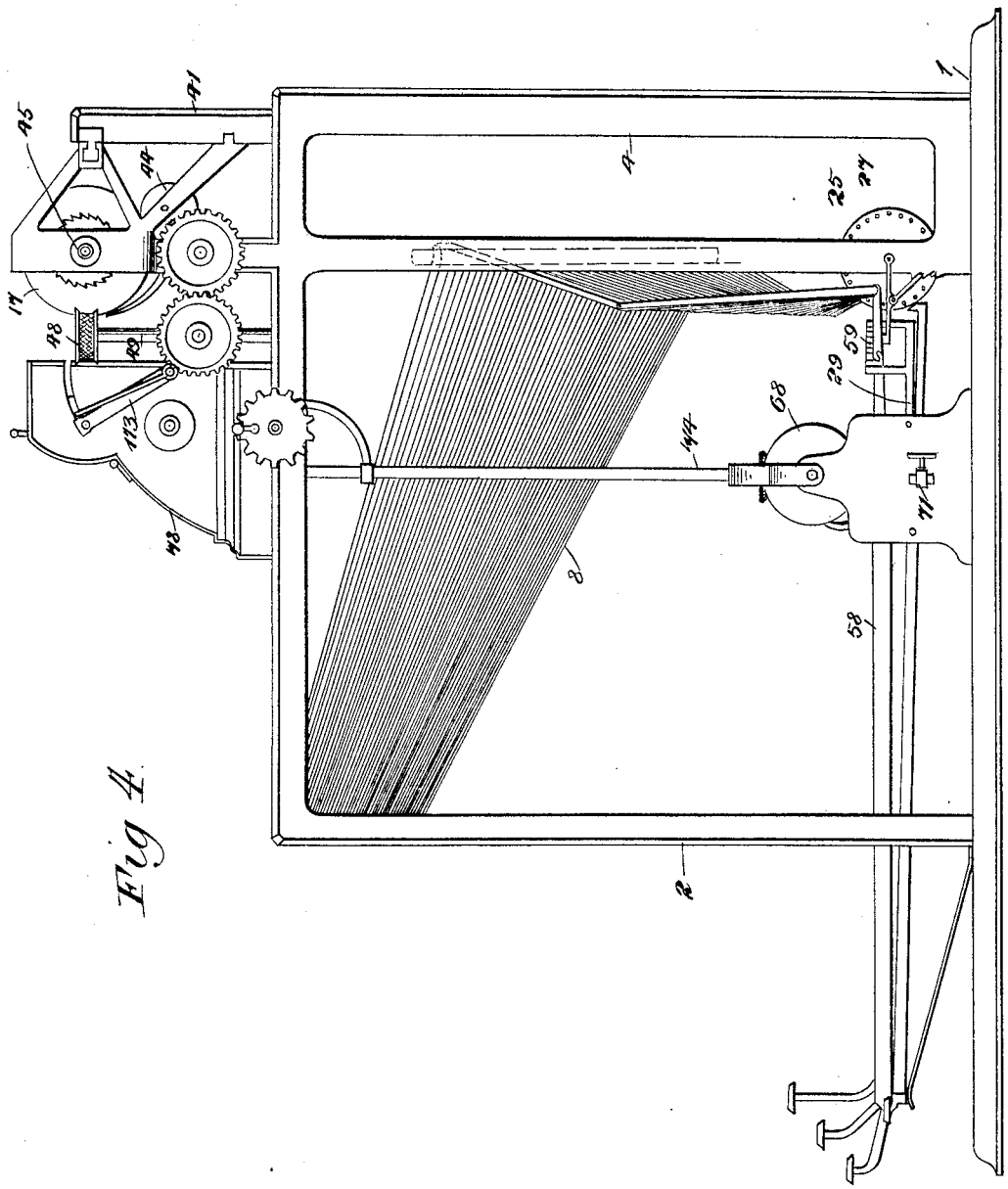

Figure 1 is a front elevation of a type-writing machine embodying my invention. Fig. 2 is a plan view thereof. Fig. 3 is an end view. Fig. 4 is an end view opposite that of Fig. 3. Fig. 5 is a detail showing a feed-screw mechanism. Fig. 6 is a plan view of a swinging frame for operating the feed-screw. Fig. 7 is a section of the impression-roller. Fig. 8 is a side view of the frame shown in Fig. 6. Fig. 9 is a detail view showing the operation of the type-levers and key-levers. Fig. 10 is a front view of the same. Fig. 11 is an elevation, partially in section, of an adding mechanism employed in connection with the machine. Fig. 12 is an end view thereof. Fig. 13 is a detail view of a key-lever employed. Fig. 14 is a plan view of a mechanism for operating the adding-wheels. Fig. 15 is a partial plan view and partial section showing printing-wheels employed with the adding-machine. Fig. 16 is a section through the line 16 16 of Fig. 15. Fig. 17 is a rear elevation of the adding-wheels employed. Fig. 18 is a side view of an adding-wheel employed. Fig. 19 is an edge view thereof. Fig. 20 is a sectional elevation of a printing-wheel employed. Fig. 21 is an end elevation showing the mechanism for printing a letter or bill head. Fig. 22 is an end view of a frame for carrying a paper roll. Fig. 23 is a section substantially through the line 23 23 of Fig. 22. Fig. 24 is a top edge view of a printing-platen employed. Fig. 25 is a face view thereof. Fig. 26 shows a lining device, and Fig. 27 is a partial section and partial elevation of the lining device.

The machine comprises a base-plate 1, upon which is mounted a frame comprising uprights 2, 3, and 4, arranged at the end of the base-plate and connected by cross-bars 5, and also connected by a front bar 6. Extended between the uprights 3 at the opposite ends of the machine is a fulcrum-rod 7. This fulcrum-rod is curved downward between its ends in the arc of a circle and is designed to support the series of type-levers consisting each of a portion 8, extended above said fulcrum-rod and pointing toward a central portion of the frame or to a central portion of the impression-roller, as will be hereinafter described, and each portion 8 has a downwardly-extended arm 9, having a knuckle-joint connection 10 with a link 11, having a ball-and-socket connection with a key-lever 12. The several key-levers 12 are mounted to swing on a rod 13, mounted on posts 14, extended upward from the base-plate of the machine. Each type-lever has upon its free end a type 15. When in a normal position, the portions 8 of the several type-levers will extend forward and upward and rest upon a curved bar 16, attached to the frame of the machine. This bar 16 may be suitably padded to prevent jar or noise as a type-lever falls upon the same.

Mounted in a frame 16ª is an impression-roller 17, designed to carry the paper across the machine in the usual manner and also to receive the impression of the several types. Motion is imparted to the frame 16ª, to carry the roller 17 longitudinally, by means of a feed-screw 18, engaging with a rack 19 on the lower portion of the frame 16ª. The bar carrying the rack 19 is inclined upward from the ends of the rack to the ends of the frame 16ª, so that the said frame and impression-roller may be moved a suitable distance over each end of the machine-frame. The feed-screw 18 has journal-bearings in uprights 20 on the cross-bars 5 of the frame, and one of the journals of this feed-screw has attached to it a bevel-gear 21, meshing with a bevel-gear 22 on a vertical shaft 23, having bearings in lugs on one of the uprights 3. The lower end of this shaft 23 is provided with a bevel-pinion 24, meshing with a bevel-gear 25, mounted to rotate on a stud 26, extended from the frame of the machine. On its side opposite that provided with teeth the bevel-gear 25 is provided with an annular row of pins or projections 27, designed to be successively engaged by a finger 28 on a lever 29, mounted to swing on a shaft 30, extended transversely of the machine.

Mounted to swing on the opposite end of this shaft 30 and extended forward is an arm 31, and this arm 31 is connected to the forward end of the lever 29 by means of a presser-bar 32, extending underneath the outer ends of the several key-levers 12, and upon which the same are designed to normally rest. This bar 32 has at one end a short continuation-piece 33, connected at its end to an arm 34, mounted to swing on the shaft 30. It will be seen in Fig. 1 that the portion 33 has its end overlapping the end of the portion 32, the purpose of which will more fully appear hereinafter.

The bar 32 is held yieldingly against the under side of the key-levers by means of springs 35, extended upward from the base of the machine. By this construction when a key-lever is depressed the bar 32 will also be depressed and rock the lever 29, and the finger 28 on the end of this lever 29 will engage one of the teeth 27 on the gear-wheel 25 and cause it to rotate one step, and as this gear-wheel is rotated one step a partial rotation will be imparted to the feed-screw 18, and thus feed the frame 16ª and roller 17 to the left a distance corresponding to the desired space between letters forming a word. When it is desired to return the impression-roller 17 to its position at the right of the machine, the feed-screw 18 may be rotated by turning the gear 25 by means of the crank 36 thereon. It will be observed that the finger 28 on the lever 29 is arranged on a plane sufficiently low to allow this reverse movement of the gear 25 without contacting the pins 37 with said finger.

The frame 16ª, carrying the impression-roller 17, is provided at its ends with rearwardly disposed and converging arms 37 and 38, and these arms 37 and 38 have connected with them boxes 39, engaging with and adapted to slide upon a T-shaped rail 40, secured to uprights 41 on the machine-frame. The frame 16ª also has downwardly and rearwardly inclined arms 42, the arm 42 at one end of the frame being connected with the arm 42 at the other end of the frame by means of a slide-bar 43, sliding in grooves formed on the inner edges of the uprights 41.

Having journal-bearings in the arms 42 is a feed-roller 44, which may be covered with rubber or similar flexible material. This feed-roller 44 bears against the under side of the roller 17 and is designed to feed the paper thereon. One of the journals of this feed-roller 17 is extended through its arm 42 and is provided with a finger-piece 45, by means of which said feed-roller may be rotated. Spring-fingers 46 are attached at one end to the rack-bar 19 and extend upward against the face of the roller 17 and are designed to hold the paper in contact with the roller in the usual manner. Secured to the journal to which the finger-piece 45 is attached is a ratchet-wheel 46, the teeth of which are designed to be engaged by a spring-pawl attached to one of the arms 42 and by means of which the space between the lines may be regulated.

I will now describe the means for feeding an inking-ribbon 47 longitudinally in front of the impression-roller 17. The ribbon 47 is attached at one end to a drum 48 on a vertical shaft 49, mounted to rotate on the frame of the machine, and at its opposite end the said ribbon 47 is attached to a drum 50 on a shaft 51, mounted to rotate on the machine-frame.

On the shaft 49 is a bevel-gear meshing with a bevel-gear on the shaft 52, which has on its outer end a gear-wheel 53, meshing with a gear-wheel 54 on an extended journal of the feed-screw 18. By this construction it will be seen that when the step-by-step motion is imparted to the feed-screw a similar motion will be imparted to the shaft 49, and this motion of the shaft 49 will draw the ribbon 47 longitudinally of the impression-roller. The ribbon 49 may be rewound upon the drum 50, when the cylinder 17 is returned to its right-hand position, by means of a gear-wheel 55, engaging with the thread of the feed-screw 18 and also meshing with a gear-wheel 56, mounted on the shaft 51. As before stated, the several type on the type-levers 8 are designed to strike the paper at a common center. To hold the ribbon 47 in proper position in relation to the paper or to the impression-roller, I employ a perforated plate 57, mounted on arms 58, extended upward from the frame of the machine. This plate 57 is provided with slots at its ends at opposite sides of its opening, through which slots the ribbon 47 extends.

Having described the type-writing machine proper, I will now describe an adding-machine used in connection therewith and in which nine of the levers of the type-writing machine are utilized for operating the adding-machine, the parts being shown as constructed so that the depression of one of these keys may both operate the type to print upon the paper on the impression-cylinder in the usual manner and at the same time operate the adding-machine, and I will also describe a construction whereby the said keys may be disconnected, so as to be used either with the writing-machine without imparting motion to the adding-machine or with the adding-machine without imparting motion to the writing-machine.

Arranged above the short portion 33 of the bar 32 are nine levers 58, which, for convenience, I will term "numeral-levers." The finger-pieces of these numeral-levers are numbered consecutively from "1" to "9." As above stated, the bars 32 and 33 are so connected that the bar portion 32 may be forced downward by pressing one of the keys above each without imparting motion to the portion 33 of the said bar; but should one of the numeral-keys bearing upon the portion 33 of the bar be pressed downward the portion 32 of the bar will be forced downward with the portion 33, operating the several parts, as before described.

The several key-levers 58 are mounted to rock on the shaft 13, on which the several key-levers 12 are also mounted to rock. Extended across the upper side of the several key-levers 58 is a bar 59, one end of the said bar 59 having a forwardly-extended arm 60 pivotally connected to a bracket 61, extended upward from the base 1 of the machine, the top of the said bracket 61 being arranged below or out of the way of the several key-levers 58. The opposite end of the said bar 59 has a forwardly-extended arm 62, pivoted near its end to the frame portion of the machine. The portion of the bar 59 which extends over the key-levers 58 is provided with a series of bearing-points successively increasing in distance from the pivotal point of the said bar 59—that is, the said bar 59 has a bearing-point 63, engaging on the upper side of the first key-lever 58 of the series of the nine, and a bearing-point 64, somewhat beyond the bearing-point 63 and engaging with the second key of the series, and this succession of bearing-points is carried across the several keys, as plainly indicated in Fig. 14. It will be seen, therefore, that as the first key of the series 58 is depressed the bar 59 will be raised a certain distance, and that should the last key of the said series be rocked the said bar 59 will be moved a distance nine times greater than the movement imparted by the first key, and of course these relative movements will be imparted by the intermediate keys.

The arm 62 of the rod 59 has its end extended beyond the pivotal point of the said arm, and on this extended end is mounted a pinion 65, from which a spring yielding arm 66 extends upward and is adapted to engage with its hook end with one of the series of pins 67, projected from a miter-wheel 68, mounted to rotate on a stud extended from a standard 69, projected from the base of the machine.

Meshing with the pinion 65 is a gear 70, mounted to rotate in a horizontal plane in the standard 69. A yoke 71 has trunnion-bearings in lugs extended from one side of the standard 69, and this yoke 71 is provided with a tooth 72, meshing with the gear 70. The object of this construction will be fully explained hereinafter. The gear 68 meshes with a bevel-pinion 73 on the lower end of a shaft 74, to the upper end of which is attached a pinion 75, meshing with a bevel-gear 76 on a shaft 77, mounted to rotate in a casing 78, secured to the type-writer frame near one end of the impression-roller. This casing 78 contains the several adding and printing wheels, the construction of which will more fully appear.

Mounted to slide on, but to rotate with, the shaft 77 is a gear-wheel 79, adapted to engage with either one of the gear-wheels 80 of the adding-wheels. The several numbering-wheels 80 are mounted to rotate independently on a shaft 82, extended through the casing 78, and on each numbering-wheel 80 is a disk 83, provided on its periphery with a series of numbers reading from "1" to "0," and these several numbers may be seen through a sight-opening 81 in the casing 78.

As here shown, the gear-wheel 79 is in engagement with the adding-wheel of the highest denomination in the series. Obviously by pressing downward one of the numeral-keys the bar 59 will be rocked, and this rocking of the bar 59 will cause the yielding arm 66 to rotate the wheel 68 a distance corresponding to the radius of the movement of the bar 59, and this will cause a corresponding rotation of the gear 79, and through this gear 79 the adding-wheel with which it engages will be rotated the proper distance to bring its number printed on the periphery of its disk 83 and corresponding to the numeral-key depressed in alinement with the sight-opening 81. In order that the same motion may be given to a wheel of the next lower denomination, I have provided an automatic motion which will move the gear-wheel 79 from, as an example, hundreds place to tens place, and then to units place. This means comprises a frame 84, consisting of fingers engaging loosely on opposite sides of the gear-wheel 79. The lower portion of this frame 84 is provided with a tapped opening engaging with a screw-shaft 85, mounted to rotate in the casing 78. On the end of the shaft 85 is a toothed wheel 86.

As shown in Fig. 12, a hammer 87, pivoted to the frame of the machine, is connected by a wire 88, which extends over pulleys 89 90, to the arm 34, the connection between the wire 88 and the arm 34 being in the form of a hook for a purpose to be hereinafter described. It will be noted that this arm 34 is rigidly connected to the portion 33 of the bar 32, and thus when a key is depressed the arm 34 is carried down, so that the wire 88 lifts the hammer 87 against the resistance of the spring 91. During the upward movement of the hammer the numeral-wheel, at this time engaging with the wheel 79, is turned the proper distance, but when the key operating the same is released the hammer 87, acting under the pressure of the spring 91, strikes a tooth of the wheel 86, thus giving it a partial rotation, which turns the screw-shaft 85, which in turn imparts motion to the frame 84, thus sliding the gear-wheel 79 to the right hand on the shaft 77 to engagement with an adding-wheel of the next lower denomination, the distance being regulated by the size of the teeth on the wheel 86. The hammer 87 serves also as a ratchet or pawl to prevent the wheel 86 from turning too far. Thus it will be seen that the movement of the wheel 84 is accomplished by the same motion of the key-lever as is required to turn the numeral or adding wheel. The wheel 84, after it shall have traveled its distance, may be returned to its normal position by lifting the hammer 87 and rotating the shaft 85 in a reverse direction by means of the crank shown on the wheel 86.

I will now describe how the carrying process is performed. As will be seen, if the numeral "9" is turned by a stroke of a key-lever and it is again desired to strike said numeral on the same wheel, the wheels being only numbered from "1" to "0," there will show as a result the numeral "8" on the wheel with one to carry. This one must be transferred automatically to the numeral-wheel of the next higher denomination. To do this, I provide each numeral or adding wheel with a single tooth 92.

A shaft 93 is extended through the casing 78 just under and to the rear of the numeral or adding wheels. On this shaft is a series of small pinions 94, having teeth corresponding in mesh to the teeth of the adding-wheels. Each of these pinions 94 is so placed that it will engage with the teeth of the adding-wheel of a higher denomination and to be engaged by the tooth 92 on an adding-wheel of the next lower denomination. When the wheel of a lower denomination makes one complete rotation, its tooth 92 will mesh with a pinion 94, turning the same through the space of one tooth, which, it will be seen, imparts motion to the adding-wheel of the next higher denomination from one numeral to another on said wheel, thus giving the desired result. The pinions 94 are mounted to turn freely on the shaft 93 in either direction, and when it is necessary to subtract a reverse operation of the parts is to take place. It is necessary to provide an indicator on the outside of the casing 78, so that the automatic movement of the wheel 79 may be noted as it goes from one numeral or adding wheel to another. For this purpose I provide an arm 95, extended from the frame 84. This arm 95 has pivotally connected to it a finger 96, which projects through a slot-opening in the casing 78, and this projected end is provided with a pointer 97, which moves over the surface of the casing 78 from the hundreds place to units, as regulated by the frame 84.

It may be well to note here that should it be desired to write the number "90908," where ciphers occur, without striking a cipher-key effecting the turning parts or adding-wheels, this is provided for as follows: The cipher-key is also placed at its extremity over the portion 33 of the bar 32, which connects each with a hammer 87 and its automatic movement. At its other end this cipher-key does not connect with the bar 59, so that it has no effect on the adding-wheels.

After certain numbers shall have been added together and printed it is necessary to return the numeral or adding wheels to their original position. For this purpose I provide the shaft 82 with a series of radial pins 99 and the several wheels 80 with outwardly-extended pins 100. When the shaft 82 is in its normal position, the pins 99 will be out of line of the movement of the pins 100, but by forcing said shaft 82 longitudinally against the resistance of a spring 101, bearing at one end against a finger-piece on said shaft and at the other end against the casing 78, and then by rotating the shaft 82 the radial pins 99 on the shaft will gradually engage with the several pins 100, so that the several wheels 80 may be returned to their normal position. Upon the release of the shaft 82 the spring 101 will return the same to its original position, with the pins 99 out of line of the movement with the pins 100.

To prevent the backward rotation of the shaft 82, I provide it with a ratchet-wheel 102, engaged by a pawl 103, pivoted to the inner side of the casing 78.

I will now describe the means for printing at one stroke the sum of the added figures. For this purpose I have provided a set of type-wheels corresponding in number to the numeral or adding wheels. These type or printing wheels 103 are plainly shown in detail in Fig. 20, from which it will be seen that they have a set of cogs equal in number with the cogs on the adding-wheels with which they mesh. Each cog of a wheel 103 is provided with a longitudinal bore within which is designed to move the stem 104 of a type 105.

The type 105 are designed to have a yielding movement relatively to the printing-wheel, and for this purpose I employ a spring 106, bearing at one end against the inner end of the stem 104 and at the opposite end against the inner wall of the bore in the wheel, as plainly shown in Fig. 20. The type on the wheel 103 are numbered consecutively from "1" to "0," the "0" being placed on the rear side of the wheel instead of on the front side, as on the numeral-wheel.

It will be seen that the numbering-wheels 103 are all mounted upon a shaft 107, and that while said printing-wheels are in position to be operated by the wheels 80 there will be too much space between said printing-wheels for printing purposes, and therefore when these printing-wheels are moved to their printing position they must be assembled or moved toward each other to contract the space between the wheels. To provide for this assembling of printing-wheels I have provided each wheel 103 around its axis at each side with a depression 108, each depression being designed to receive a spring 109 when the same shall have been compressed. The spring 109 between each pair of wheels 103 is coiled loosely around a shaft 107 and is made in the form of two truncated cones, the smaller portion or apex being at the center. Thus it will be seen that the wheels 103 may revolve loosely on the shaft 107 without affecting the springs, the said springs at this time serving to hold the wheels 103 in proper position for engagement with the wheels 80. Mounted on the shaft 107 at the outer side of each end wheel 103 is a disk 110. It will be seen by reference to Fig. 15 that the side walls of the casing 78 converge toward a front opening 111.

The shaft 107 has its ends extended through arc-shaped slots 112 in the converging side walls of the casing 78, and from these extended ends links 113 extend to a pivotal connection with the outer side of the casing 78. Therefore by pushing these links forward the shaft 107 will be moved forward, and during this forward movement the converging walls of the casing, engaging the disk 110, will force the several wheels 103 toward each other or toward the central disk, the springs 109 telescoping into the depressions or recesses 108, and when the printing-wheels or the type shall have reached the opening 111 and shall have reached their printing position the several type will be properly spaced for printing on the paper, and at this time the type may be forced against the ribbon 47 to make an impression upon the paper. To move the said wheels 103 forward, I have provided a locking-bar 114. This locking-bar extends through the slots 112 and has at each end an arm 115, fulcrumed to the studs upon which the arms 113 are pivoted. At its central portion this locking-bar 114 has a finger-piece 116, extended upward through a slot-opening in the top of the casing 78. When not in use, this bar 114 will lie in a position toward the opening in the casing 78. When it is to be used for locking the wheels 103 and moving the same to their printing position, the finger-piece 116 is to be moved forward, so that the rod 114 will move between parts of the several wheels 103. At the completion of this movement spring yielding fingers 117 will snap over the shaft 107, then upon the forward motion of the finger-piece 116 the several wheels may be moved toward the printing-cylinder, and during this movement, of course, the converging walls of the casing 78 will cause the several wheels 103 to be assembled in the manner above described. When the finger-piece is drawn back to its original position, the springs 109 will gradually press the wheels 103 apart, thus restoring them to their original position. Then by rotating the rod 114 the finger device 117 may be disengaged from the shaft 107 and the said rod 114 moved out of connection with the several wheels.

It will be seen that when all the wheels are moved to their printing position, if all denominations of the series of wheels 103 are not used in adding, there may be printed all the ciphers in the denominations not used. Thus "00 976,976" being used the ciphers of the higher denominations would also be printed. To avoid this, I have provided means for stopping out the ciphers not desired to be printed. This means consists of a number of thin plates 118. The plates 118 are equal in number to the number of printing-wheels, and each plate is designed to be moved over the face of the type on said printing-wheel. Each plate 118 has stem portions 119, extended upward through a perforation in a plate 120, extended forward from the casing 78, and between this plate 120 and the finger-piece on the upper end of the stem is arranged a spring 121, which serves to hold the plate in its normal upward position. These plates when pressed down cover the space opposite each wheel, so that if the wheels for printing are pressed toward the cylinder those stopped out by the plates 118 are prevented from printing.

It will be seen that the stems 119 of the several plates 118 project one higher than another and that the finger-piece of the upper end of a longer stem 119 projects slightly over the upper surface of a finger-piece on the next shorter stem. Therefore it will be seen that a downward pressure of the one plate 118 will cause the downward movement of all the plates 118 at the left thereof, so if it is desired to print "967" the plate marked in the thousandths place will be pressed down, thus carrying all the keys to its left hand, closing the printing-space against those wheels 103, while the still further movement of the finger-piece 116 will cause the desired wheels to print upon the paper.

When an error shall have been made in addition, the same may be rectified by rotating the wheel 68 in a reverse direction by depressing the desired key. To cause this reverse movement, the gear 70 may be rotated by means of the yoke 71 sufficiently far to move the arm 66 to a position on the opposite side of the wheel 68 or to engage with the pins on said wheels at the side opposite that in which the said arm is placed when in its operative position. When it is desired to operate the type-writing machine and the numeral-keys without imparting motion to the adding device, the pinion 65 may be rotated by means of the gear 70 to move the arm 66 wholly out of engagement with the pins on the wheel 68 or in a position indicated in dotted lines in Fig. 11. It will be observed that the axis of the pinion 65 is in a vertical plane with the center of the wheel 68.

It may be at times desired to disconnect the adding device from the type-writer, so that adding may be done without writing. For this purpose the nine numeral key-levers are divided at 122. The connection between the shorter portion and the longer portion of a lever is made in the form of a hook on the adjacent end of each section, as plainly indicated in Fig. 13. When these hook ends 123 are interlocked, the shorter section may be moved upward with the longer sections. The several short sections rest upon a bar 124, extended horizontally from an arm 125, pivotally connected to the frame of the machine. A brace-rod 126 is pivotally connected at its upper end to the arm 125 and is designed to engage at its free end with a tooth of a rack 127, formed on an upright of the machine-frame. By elevating the bar 124 and supporting each by means of the brace 126 engaging against the upper tooth of the rack 127 the shorter portions or sections of the key-levers will be raised out of engagement with the longer sections, and therefore these longer sections may be operated to rotate the wheels without imparting motion to the type-levers having connection with the shorter members of the said levers.

I will now describe an attachment for the type-writer by means of which a letter or bill head may be printed on a sheet of paper previous to writing thereon with the type-writer.

Attached to the arms 27 are upwardly and rearwardly inclined arms 128, and from the upper ends of these arms 128 a plate 129 extends downward and forward, and upon this plate is secured a platen or pad 130 of a yielding material—such, for instance, as rubber. This platen or pad, it will be seen, extends at its front edge over the impression-roller 17. At the rear edge of the pad 130 and extended lengthwise of the plate 129 is a cutter-plate 131. It may be here stated that the plate 129 is of a length equaling that of the impression-roller 17 and of course moves therewith.

Inclined upward and rearward from the uprights 41 are bars 132, from the upper ends of which a plate 133 extends at an incline downward, and upon this plate 133 is secured an inking-pad 134. Pivotally connected to the upper ends of the bars 132 are links 135, which are provided with longitudinal slots, in which engage the trunnions 136 of a type-plate 137, upon the face of which may be secured in any desired manner the type-characters forming a letter or bill head to be printed upon the paper. From the sides and ends of this plate 137 bars 138 and 139 extend and meet at a central point, where a handpiece 140 is provided.

Depending from the arms 42 are hangers 141 and 142, in which is journaled a spindle 143, upon which a strip of paper 144 is wound. This strip of paper 144 extends up between the rollers 17 and 44 and over the pad 130. In operation the paper may be drawn up over the pad 130 and then the printing-plate 137 swung upward and over and then forced down upon the paper, printing the desired head thereon, and then it may be moved back to a position against the inking-pad, as indicated in Fig. 21. After writing the desired matter upon the paper it may be drawn off from the main strip by means of the cutter or knife 131.

In connection with the mechanism just described I have provided means for placing the vertical lines on paper when it is desired to prepare the same for a bill. This means consists of a series of rollers 145, mounted to rotate on a shaft 146, supported in a frame 147, having a swinging connection with the frame 16ᵃ. The frame 147 is here shown as having downwardly-extending end portions provided with slots, through which studs from the frame 16ᵃ project. Therefore it will be seen that the rollers 147 may move downward by gravity and engage the paper.

As a means for inking the rollers 145 I employ a pad 148, secured in a casing 149, extended between the end members of the frame 147. From its lower side the pad 148 is transversely curved to correspond substantially with the contour of the rollers 145. In operation it is obvious that the rollers 145 may be spaced on the shaft 146 to provide the desired distance between lines at each side of the paper. It will be seen that the vertical lines will be printed on the paper after the type-written matter shall have been placed thereon. When not desired for lining, the frame 147 may be tilted forward and downward, so as not to engage with the paper.

It is obvious that the combination of the device shown and described in my invention will prove of great utility, as it will save time and also save the expense of printed letterheads and bill-heads.

Having thus described my invention, I claim as new and desire to secure by Letters Patent—

1. A type-writer, comprising a base, a frame mounted thereon, a series of type-levers fulcrumed in the frame, key-levers for operating the type-levers, an impression-roller, a frame in which said impression-roller is mounted, a screw-shaft for moving said frame, a bar extended under the outer ends of the several key-levers, a lever extended from said bar, a bevel-gear provided on one side with a series of teeth adapted to be engaged consecutively by the end of the lever operated by said bar, and a connection between said bevel-gear and the feed-screw, whereby said feed-screw may be rotated at each downward movement of a key-lever, substantially as specified.

2. A type-writer, comprising a base, a frame mounted thereon, a series of type-levers fulcrumed in the frame, key-levers for operating said type-levers, a presser-bar extended along the outer ends of the said key-levers and adapted to be engaged thereby, a lever extended from said presser-bar and having an upwardly-extended finger at its end, a bevel-gear provided with an annular row of pins or projections adapted to be successively engaged with said finger, the finger being normally out of engagement with the pins, an impression-roller carriage, a rack on said carriage, a feed-screw with which said rack engages, a beveled pinion on the end of said feed-screw, a vertical shaft, a pinion on the lower end of said shaft engaging with the bevel-gear, and a pinion on the upper end of said shaft engaging with the bevel-pinion on the feed-screw, substantially as specified.

3. A type-writer, comprising a base, a frame supported thereon, a series of type-levers fulcrumed in the frame, fulcrumed key-levers for operating said type-levers, a presser-bar extended under the outer ends of the said key-lever, springs for holding said presser-bar normally against the key-levers, a lever extended from one end of said presser-bar and having an upwardly-extended finger at its end, a bevel-gear having a series of projections from one side all normally out of engagement with, but adapted to be successively engaged by said upwardly-extended finger, the said finger normally resting in a plane below said projections, whereby said wheel may be turned in a reverse direction, and an impression-roller carriage operated from said bevel-gear, substantially as specified.

4. A type-writer, comprising a base, a frame mounted thereon, a series of type-levers fulcrumed in said frame, key-levers for operating said type-levers, an impression-roller moved longitudinally by a downward movement of a key-lever, shafts extended vertically from the frame forward of the impression-roller, drums on said shafts to which the ends of an inking-ribbon are to be attached, a feed-screw for moving the impression-roller longitudinally, and gearing between said feed-screw and one of the upright shafts, whereby said upright shafts are rotated to feed the ribbon, substantially as described.

5. A type-writer, comprising a base, a frame mounted thereon, type-levers fulcrumed in the frame, key-levers for operating the type-levers, an impression-roller frame, a feed-screw operated by a downward movement of a key-lever for moving said frame longitudinally, an impression-roller mounted in the movable frame, vertical shafts to which the ends of an inking-ribbon are attached, a gear-wheel on a journal of the feed-screw, a bevel-gear on one of the upright shafts, a bevel-gear on a horizontal shaft engaging with the first-named bevel-gear, a gear-wheel on said horizontal shaft engaging with the first-named wheel, and a gear-wheel on the other upright shaft having connection with the feed-screw, whereby the ribbon may be wound in the opposite direction upon the return movement of the frame carrying the impression-roller, substantially as described.

6. A type-writer machine, comprising a series of type-levers, key-levers for operating the same, a presser-bar arranged underneath the outer ends of the key-levers, and consisting of two parts having overlapping ends, whereby one part may be operated independently of the other part and whereby both parts may be operated together, an adding device, a series of numeral-levers, resting on the shorter section of the presser-bar, a pivoted bar extended across said numeral-levers and bearing upon all the numeral-levers successively at greater distances from the fulcrum-point of the numeral-levers, and means operated from said bar for operating the adding-machine wheel, substantially as described.

7. The combination with a type-writer, of an adding-machine, comprising a series of disks or wheels, numeral-levers having connection with type-levers, a bar extended across several numeral-levers, the said bar being provided with a series of bearing-points successively increasing in distance from the pivotal point of said bar, a spring yielding finger carried by an arm of said bar, a bevel-gear mounted on a horizontal shaft, a series of pins adapted to be engaged by the hook end of said spring yielding finger, and means operated by said bevel-gear for operating the adding-machine, substantially as described.

8. The combination with a type-writer, of numeral-levers having connection with type-levers, an adding-machine comprising a series of toothed wheels mounted in a casing, a shaft mounted in said casing, a gear-wheel movable longitudinally on said shaft, but adapted to rotate therewith for transmitting motion to the adding-wheels, a frame comprising fulcrums engaging on said sliding wheel, a screw-shaft for imparting motion to said frame, means for rotating said screw-shaft, and means operated by the numeral-levers for rotating the gear-wheel engaging with the adding-wheels, substantially as described.

9. The combination with the type-writer, of a series of numeral-levers having engagement with type-levers, a fulcrum-bar extended across the upper sides of said numeral-levers, and provided with a series of bearing-points successively increasing in distance from the pivotal point of said bar to engage at varying distances upon the numeral-levers, a pinion mounted on an arm extended from said bar, a resilient finger extended upward from said pinion and having a hook end, horizontally-rotating gear-wheels engaging with said pinion, means for imparting a rotary movement to said wheels, a bevel-gear, a series of pins extended from one side of said bevel-gear and adapted to be engaged by the hook end of the resilient finger, a vertical shaft, a pinion upon the lower end of said shaft, engaging with the bevel-gear, and an adding device operated from the upper end of said shaft, substantially as described.

10. The combination with a type-writer, of an adding-machine, adapted to be operated by a depression of the key-levers of the type-writer, the said adding-machine comprising a series of numbering-wheels mounted to rotate independently on a shaft in a casing, numbered disks on each wheel, a gear-wheel adapted for engagement with each one of the numbering-wheels, means for moving said gear-wheel longitudinally of the casing, means for rotating said gear-wheel, a set of type-wheels corresponding in number to the numbering-wheels and meshing therewith, and means for moving said printing-wheels to a printing position, substantially as described.

11. The combination with a type-writer, of an adding-machine, adapted to be operated by a depression of the key-levers of the type-writer, the said adding-machine comprising a series of numbering-wheels mounted to rotate independently on a shaft in a casing, numbered disks on each wheel, a gear-wheel adapted for engagement with each one of the numbering-wheels, means for moving said gear-wheel longitudinally of the casing, means for rotating said gear-wheel, a set of type-wheels meshing therewith, means for moving said printing-wheels to a printing position, and means for stopping out certain of the printing-wheels, substantially as described.

12. The combination with a type-writer, of an adding device, comprising a casing mounted on the frame of the type-writer, a shaft extended through the said casing, a series of numbering or adding wheels mounted to rotate independently on said shaft, means for operating said numbering or adding wheels upon the depression of a key of the type-writer, a set of printing-wheels carrying type, each printing-wheel having a series of teeth equal in number to the teeth on the adding-wheel with which it engages, a shaft on which said printing-wheels are mounted, a spring arranged between each pair of printing-wheels, links extended from the shaft upon which the printing-wheels are mounted and having pivotal connection with the casing, said shaft extending through arc slots in the casing, and means for moving said printing-wheels forward and at the same time moving them toward each other, substantially as specified.

13. The combination with a type-writer, of an adding-machine, comprising a casing mounted upon the frame of the type-writer, a series of numbering or adding wheels mounted in said casing, a series of printing-wheels having teeth engaging with the teeth of the numbering or adding wheels, type yieldingly mounted in said printing-wheels, means for moving said printing-wheels to a printing position, and means for assembling the printing-wheels, substantially as described.

14. The combination with a type-writer, of an adding-machine, comprising a casing having converging side walls, a shaft extended through slot-openings in said converging side walls and having connection with swinging links, a series of printing-wheels mounted to rotate independently on said shaft, type carried by said printing-wheels, a spring arranged between each pair of printing-wheels, a disk mounted on the shaft at each end of the printing-wheels, means for moving said shaft forward and whereby the disks engaging converging side walls of the casing will assemble said wheels, and means for rotating said wheels by the depression of the key-levers of the type-writer, substantially as described.

15. The combination with a type-writer, comprising an impression-roller and an inking-ribbon, of a series of printing-wheels carrying numeral-type, means for moving said printing-wheels against the inking-ribbon, plates for stopping out certain of said printing-wheels, a series of numeral-wheels adapted for engagement with the printing-wheels, and means for operating said numeral-wheels to add numbers, by the depression of the keys of the type-writer, substantially as described.

16. The combination with a type-writing machine, of an adding-machine, comprising a number of printing-wheels, means for moving said printing-wheels toward the impression-roller of the type-writing machine, a series of adding-wheels normally engaging with the printing-wheels, a shaft on which said adding-wheels are mounted to rotate independently, pins extended from said shaft, pins extended from the adding-wheels and adapted for engagement with the pins on the shaft upon a longitudinal movement of said shaft, and means for operating said adding-wheels upon the depression of the keys of the type-writing machine, substantially as described.

17. The combination with a type-writer, of an adding-machine, comprising a series of printing-wheels, a series of adding-wheels engaging therewith, a gear-wheel for engaging with each one of the adding-wheels, a frame engaging with said gear-wheel, a pointer carried by said frame, a screw-shaft for operating said frame, a pinion on said screw-shaft, a spring-pressed hammer for imparting a step-by-step movement to said pinion, and a connection between said hammer and the keys of the type-writer for raising said hammer, substantially as described.

18. The combination with a type-writer, of an adding-machine, operated by the depression of a key of said type-writer, comprising a casing having converging side walls and provided with an opening adjacent to the depression-roller of the type-writer, a series of printing-wheels independently mounted on a shaft having a swinging movement in said casing, a locking-bar for said wheels, devices carried by said locking-bar for engaging with the shaft on which the said wheels are mounted, a finger-piece extended from said locking-bar, a spring arranged between each pair of wheels, whereby said wheels may be moved toward each other upon a forward movement of the shaft, a series of plates adapted to be moved over the printing-wheels, means whereby several plates may be moved together, and springs for moving said plates upward, substantially as described.

19. The combination with a type-writer, of an adding device, key-levers for operating said adding device and also for operating type-levers, the said levers consisting of two sections having a separable hook connection, substantially as described.

20. The combination with a type-writer, of an adding device, numeral-levers for operating the adding device and also for operating the type-levers, each numeral-lever consisting of two sections having a hook connection, and an adjustable bar upon which the several levers normally rest, substantially as described.

21. The combination with a type-writer, of a printing-bed extended over the impression-roller of the type-writer and movable therewith, a paper-carrying spindle movable with the impression-roller, an inking-pad rigidly connected to the frame of the type-writer, slotted links pivotally connected to the frame of the said inking-pad, and a printing-plate having trunnions extended into the slots of the said links, substantially as described.

EDWARD NORMAN CHAMBERLAIN.

Witnesses:
LEMUEL P. CONNER,
GEORGE P. CHAMBERLAIN.